(12) United States Patent
Tang et al.

(10) Patent No.: US 11,483,704 B2
(45) Date of Patent: Oct. 25, 2022

(54) PHYSICAL LAYER SECURE COMMUNICATION AGAINST AN EAVESDROPPER WITH ARBITRARY NUMBER OF EAVESDROPPING ANTENNAS

(71) Applicants: University of Electronic Science and Technology of China, Chengdu (CN); Science & Technology Department of Sichuan Province, Chengdu (CN)

(72) Inventors: Jie Tang, Chengdu (CN); Liang Chen, Chengdu (CN); Hong Wen, Chengdu (CN); Xinchen Xu, Chengdu (CN); Huanhuan Song, Chengdu (CN); Kaiyu Qin, Chengdu (CN)

(73) Assignees: University of Electronic Science and Technology of China, Chengdu (CN); Science & Technology Department of Sichuan Province, Chengdu (CN)

( * ) Notice: Subject to any disclaimer, the term of this patent is extended or adjusted under 35 U.S.C. 154(b) by 108 days.

(21) Appl. No.: 17/134,475

(22) Filed: Dec. 27, 2020

(65) Prior Publication Data

US 2021/0204117 A1 Jul. 1, 2021

(30) Foreign Application Priority Data

Dec. 27, 2019 (CN) .......................... 201911377731.7
Jan. 6, 2020 (CN) .......................... 202010010737.7

(51) Int. Cl.
*H04W 12/03* (2021.01)
*H04W 12/033* (2021.01)
(Continued)

(52) U.S. Cl.
CPC ......... *H04W 12/033* (2021.01); *H04L 9/0618* (2013.01); *H04W 12/122* (2021.01)

(58) Field of Classification Search
None
See application file for complete search history.

(56) References Cited

U.S. PATENT DOCUMENTS

2016/0239666 A1* 8/2016 Obukhov ................ H04L 9/065

FOREIGN PATENT DOCUMENTS

| EP | 2566096 A2 * | 3/2013 | ............. H04L 9/002 |
| WO | WO-2005057927 A1 * | 6/2005 | ............. H04L 9/065 |
| WO | WO-2020059535 A1 * | 3/2020 | ............. G16Y 10/75 |

OTHER PUBLICATIONS

Huo, "Physical Layer Phase Encryption for Combating the Traffic Analysis Attack", IEEE, 2014, pp. 604-608. (Year: 2014).*

* cited by examiner

*Primary Examiner* — Benjamin E Lanier
(74) *Attorney, Agent, or Firm* — Bayramoglu Law Offices LLC

(57) ABSTRACT

A method for physical layer secure transmission against an arbitrary number of eavesdropping antennas includes: S1: communication between legitimate transmitter Alice and legitimate receiver Bob is confirmed; S2: Alice randomly generates a key bit $b_k$ with $M_S$ bits, maps the key bit $b_k$ into a key symbol K, and performs an XOR on the key bit $b_k$ and to-be-transmitted confidential information b to obtain an encrypted bits $b_s$; S3: Bob transmits a pilot sequence to Alice, and Alice calculates a candidate precoding space W and transmits modulated symbol streams $s=(s_1, \ldots, s_N)$ by using precoding W(e); S4: Bob measures received signal strength of each antenna, estimates the corresponding antenna vector e, inversely maps the vector e to obtain key symbols and key bits, and demodulates the received symbol streams in sequence at each activated antenna to obtain demodulated ciphertext bits; S5: Bob performs an XOR on (Continued)

observed key bits and the demodulated ciphertext bits to obtain the confidential information.

14 Claims, 4 Drawing Sheets

(51) Int. Cl.
    *H04W 12/122*     (2021.01)
    *H04L 9/06*     (2006.01)

PHYSICAL LAYER SECURE COMMUNICATION AGAINST AN EAVESDROPPER WITH ARBITRARY NUMBER OF EAVESDROPPING ANTENNAS

CROSS REFERENCE TO THE RELATED APPLICATIONS

This application is based upon and claims priority to Chinese Patent Application No. 202010010737.7, filed on Jan. 6, 2020, the entire contents of which are incorporated herein by reference.

TECHNICAL FIELD

The present invention relates to the field of information security, and more particularly, to a method for physical layer secure transmission against an arbitrary number of eavesdropping antennas.

BACKGROUND

With the rapid development of wireless networks, such as 5G, Internet of Things (IoT), wireless communication security is gradually growing as a prerequisite for various applications. Compared with traditional wired networks, wireless communications face serious threat of eavesdropping attacks, due to its broadcast nature. In wireless communication networks, cryptographic techniques are typically used at the network layer above the physical layer to ensure communication security.

Conventional cryptographic mechanisms employ pre-shared keys to encrypt/decrypt the confidential information. While the eavesdropper (Eve) is assumed to be with limited computational resources and it is computationally infeasible to decipher the encrypted information without knowledge of pre-shared keys. However, the future wireless networks support ultra-high speed and ultra-low latency communications among massive source-constrained devices, which makes cryptographic key distribution and management highly challenging. Second, massive number of wireless nodes, e.g., the sensor nodes or IoT devices, typically operate with low power consumption under unattended setting and have extremely limited computational resources. As a result, highly complex encryption technique is insufficient to adapt to such kinds of applications in future wireless mobile networks. Moreover, with the rapid development of quantum computers, current cryptographic mechanisms can be compromised. Under this case, physical layer secure communication (PLS) that exploits physical characteristics of wireless channel to secure the communication, but regardless of eavesdroppers' computational power, has attracted considerable research attentions.

The security of PLS transmission schemes depends on the advantage of received signal quality of the legitimate channel comparing to that of eavesdropping channel, such as the instantaneous/average received SNRs (signal-to-noise ratio) of the signals that bear the confidential information. Such advantages can be measured by the so called secrecy capacity, which is the maximum achievable secrecy rate, under which the legitimate transmitter (Alice) is able to send confidential information to the legitimate receiver (Bob) with both security and reliability.

Currently, mainstream techniques for physical layer secure transmission include multi-antenna beamforming and precoding, artificial noise, cooperative interference and others. However, current PLS communication schemes cannot defend against a. passive eavesdropper (Eve) with arbitrary number of antennas. This is due to the fact that when Eve keeps increasing the number of antennas, and if the antenna number of Eve is far more than the total antenna number of Alice and Bob, Eve can achieve the higher reception quality by jointly combining the received signals at each antenna. As a result, the channel advantages of Bob comparing to that of Eve are gradually decreasing. Especially, when a stronger Eve equips with much more antennas than Alice and Bob, the advantages of the legitimate channels are vanished, Which results in the unachievability of secure communication.

In the real communications, a passive Eve would never inform Alice and Bob about her number of antennas to expose her ability. Moreover, with the rapid development of SG massive multiple-input multiple-output (MIMO) and distributed MIMO, an eavesdropper with rich antenna resources is able to deploy a large number of antennas or distributed antennas for eavesdropping, But in real applications, it is impossible for both Alice and Bob to know how many antennas are specifically deployed by the eavesdropper. In this regard, it is difficult for Alice and Bob to use more antennas to defend against the eavesdropper. Current techniques for physical layer secure communications cannot defend against eavesdropper with more antennas than the total number of antennas of legitimate transmitter and receiver. Hence, the present invention proposes a method for physical layer secure communication to defend against eavesdroppers with arbitrary number of eavesdropping antennas, which has strong practicability.

SUMMARY

In view of the above-mentioned issues, an objective of the present invention is to provide a method for physical layer secure communication against an eavesdropper with arbitrary number of eavesdropping antennas. The invention is applied in a typical TDD (time division multiplexing) communication system.

In the proposed scheme, a legitimate transmitter Alice and a legitimate receiver Bob apply a protected zone with a radius R to surround themselves to prevent an eavesdropper Eve from entering the protected zone for eavesdropping, The method includes the following steps:

S1: The legitimate transmitter Alice and the legitimate receiver Bob confirm communication parameters;

S2: First, Alice independently generates random bits $b_k$ to encrypt (exclusive-OR: XOR) the binary confidential information b to obtain $b_s$. Alice maps the key bit $b_k$ into the key symbol K, and modulate $b_s=(b_{s,1}, b_{s,2}, \ldots, b_{s,N})$ to modulated symbols $(s_1, s_2, \ldots, s_N)$;

S3: Bob transmits a pilot sequence to Alice. Alice estimates channel $H_{AB}$ and process it to get a preceding weights space matrix W. According to K, Alice constructs the precoding matrix W(e). Then Alice transmits $s=(s_1, \ldots, s_N)$ by multiplying precoding W(e);

S4: Bob measures the received signal pule noise strength (SPN) of each receive antenna to obtain the antenna index vector, and inversely mapping the antenna index vector to obtain key symbols K and key bits $b_k$. Bob demodulates the received modulated symbol at each activated antenna;

S5: Bob performs XOR on the observed key bits $b_k$ and the demodulated bits $b_s=(b_{s,1}, b_{s,2}, \ldots, b_{s,N})$ to obtain the confidential information bits b; and S6: repeating steps S2-S5.

Further, step S1 includes the following steps:

S11: Alice presents the confidential bits as b=(b$_1$, b$_2$, ..., b$_N$), where each b$_i$, i=1, 2, ..., N, contains M$_S$=log$_2$ M independent bits (M$_S$ and M denote the modulation order and the total number of constellation symbols in the modulation set); and

S12: Alice and Bob confirming parameters: the number of symbol streams N and receive antennas N$_B$, such that $$N_K = \binom{N}{N_B}, \quad M_S = \log_2(N_K);$$

Where M$_S$ denotes the order of a constellation signal of the modulation type used by the communication.

Further, in Step S2, Alice obtains b$_s$ as follows:

$$b_s = (b_{s,1}, b_{s,2}, \ldots, b_{s,N}) = (b_1 \oplus b_k, b_2 \oplus b_k, \ldots, b_N \oplus b_k).$$

Further, step S3 includes the following steps:

After receiving the pilot sequence, Alice estimates an uplink channel H$_{BA}$ and transposes the uplink channel H$_{BA}$ to obtain a downlink channel H$_{AB}$=H$_{BA}^T$; and the precoding weights space W is calculated as follows:

$$\tilde{W} = H_{AB}^H (H_{AB} H_{AB}^H)^{-1} = (\tilde{w}_1, \tilde{w}_2, \ldots \tilde{w}_{N_B}); \text{ and}$$

$$W = \left( \frac{\tilde{w}_1}{\|\tilde{w}_1\|}, \frac{\tilde{w}_2}{\|\tilde{w}_2\|}, \ldots \frac{\tilde{w}_{NB}}{\|\tilde{w}_{\overline{N}}\|} \right) = (w_1, w_2, \ldots w_{N_B}).$$

Further, according to the value of K, Alice selects the (K+1)-th column in E. It is selected as e=E(:, K+1), which is used as a selection criterion for constructing the precoding. Further, Alice selects N column vectors from W corresponding to the subscript position of the N non-zero elements in e to construct W(e). Further in Step S3, Alice transmits the symbol streams s=(s$_1$, ..., s$_N$) by using the precoding W(e), and the received signals, which are expressed as:

$$y = \sqrt{\frac{P_T}{N}} H_{AB} W(e) s + n = \sqrt{\frac{P_T}{N}} \sum_{k=1}^{N} H_{AB} w_i s_k + n, \; i \in \mathcal{I}(e),$$

where I(e) denotes the subscript position of the non-zero elements in e=E(:, k+1).

Further, step S4 includes:

The number of the receive antennas of Bob is N$_B$; after receiving a signal y∈C$^{N_s \times 1}$=[y$_1$, y$_2$, ... y$_{N_B}$]$^T$, Bob measures the strength of signal-plus-noise (SPN) of each antenna as α$_i$=|y$_i$|$^2$, i=1, 2, ... N$_B$.

S41: Bob Obtains the indexes of N maximum values of α$_i$

S42: Bob obtains the observed key symbols K̂ and key bits b̂$_k$ according to the observed ê;

S43: Bob independently demodulating the symbols ŝ at the activated antennas corresponding to N non-zero elements in the observed ê to obtain bits b̂$_s$; wherein ŝ$_i$=arg min$_{s_1 \in s}$ ||y$_i$−s$_1$||$^2$, i=1, 2, ... N.

Further in Step S5, an XOR is performed by Bob on the observed key bits b̂$_k$ and the decrypted bits b̂$_s$ to obtain the confidential bit transmitted by Alice as:

$$\hat{b} = (\hat{b}_{s,1} \oplus \hat{b}_k, \hat{b}_{s,2} \oplus \hat{b}_k, \ldots, \hat{b}_{s,N} \oplus \hat{b}_k).$$

Further, the radius R of the protected zone is larger than the uncorrelated distance of the wireless channel, and the radius R is determined by the channel propagation environment and carrier frequency.

The advantages of the present invention are as follows. The method of the present invention can defend against eavesdroppers with an arbitrary number of eavesdropping antennas without the use of any pre-shared keys by legitimate transmitter and receiver. In this way, regardless of how many antennas the eavesdropper uses for eavesdropping, the lower bound of bit error rate (BER) is always guaranteed to be 0.5 at eavesdroppers, while the BER of legitimate receiver trends to zero, thus realizing high-intensity physical layer secure and reliable communication simultaneously, which is a superiority that cannot be achieved by existing physical layer secure transmission methods.

This method has the advantages such as low power consumption, low complexity, and low interference, and is capable of realizing physical layer secure communication to defend against eavesdroppers with an arbitrary number of antennas without any additional artificial noise or cooperative interference, which will not add extra power consumption to the network or cause unnecessary interference to other users.

DETAILED DESCRIPTION OF THE EMBODIMENTS

In order to facilitate a clearer understanding of the technical features, objectives and effects of the present invention, the specific embodiments of the present invention will be described hereinafter with reference to the drawings.

In order to facilitate a deeper understanding of the present invention, the physical layer where the method is implemented is explained below. Those skilled in the art should understand that the scope of protection of the present invention is not limited thereto.

The legitimate transmitter Alice and receiver Bob each employs a protected zone with a radius R to surround themselves. The radius R of the protected zone must be greater than the uncorrelated distance of the channel to prevent eavesdropper Eve from entering the protected zone for eavesdropping. Namely, the distances from Eve to Alice and Bob are both larger than R, thereby ensuring that Eve's channel is independent from the channel of Alice and the channel of Bob, respectively. The radius R is determined by the channel propagation environment and carrier frequency, and is generally 10 cm-100 cm in a rich scattering environment.

The legitimate transmitter Alice and the legitimate receiver Bob each need to be equipped with at least 2 antennas. N$_A$ and N$_B$ below denote the number of antennas of Alice and the number of antennas of Bob, respectively, where $N_A > N_B > 1$. A downlink communication is taken as an example for illustration, where Alice transmits confidential binary information $b=(b_1, b_2, \ldots)$, ($b_i \in \{0,1\}$) to Bob, and the eavesdropper Eve eavesdrops from her received signals. The eavesdropper Eve employs arbitrary number of receive antennas as $N_E$.

Figure 1:
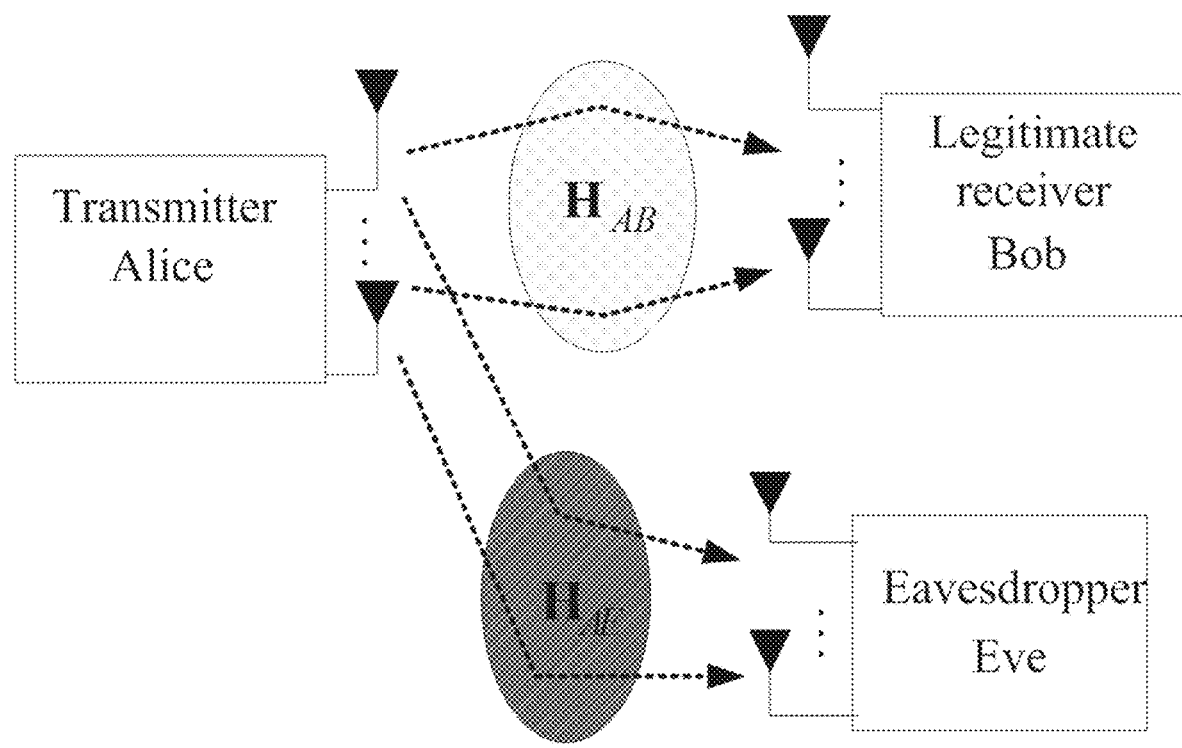
FIG. 1 is a schematic diagram of a communication system model of the present invention.

As shown in FIG. 1, the legitimate transmitter Alice communicates with the legitimate receiver Bob through the downlink channel $H_{AB}$, and the eavesdropper's channel is $H_{AE}$.

Figure 2:
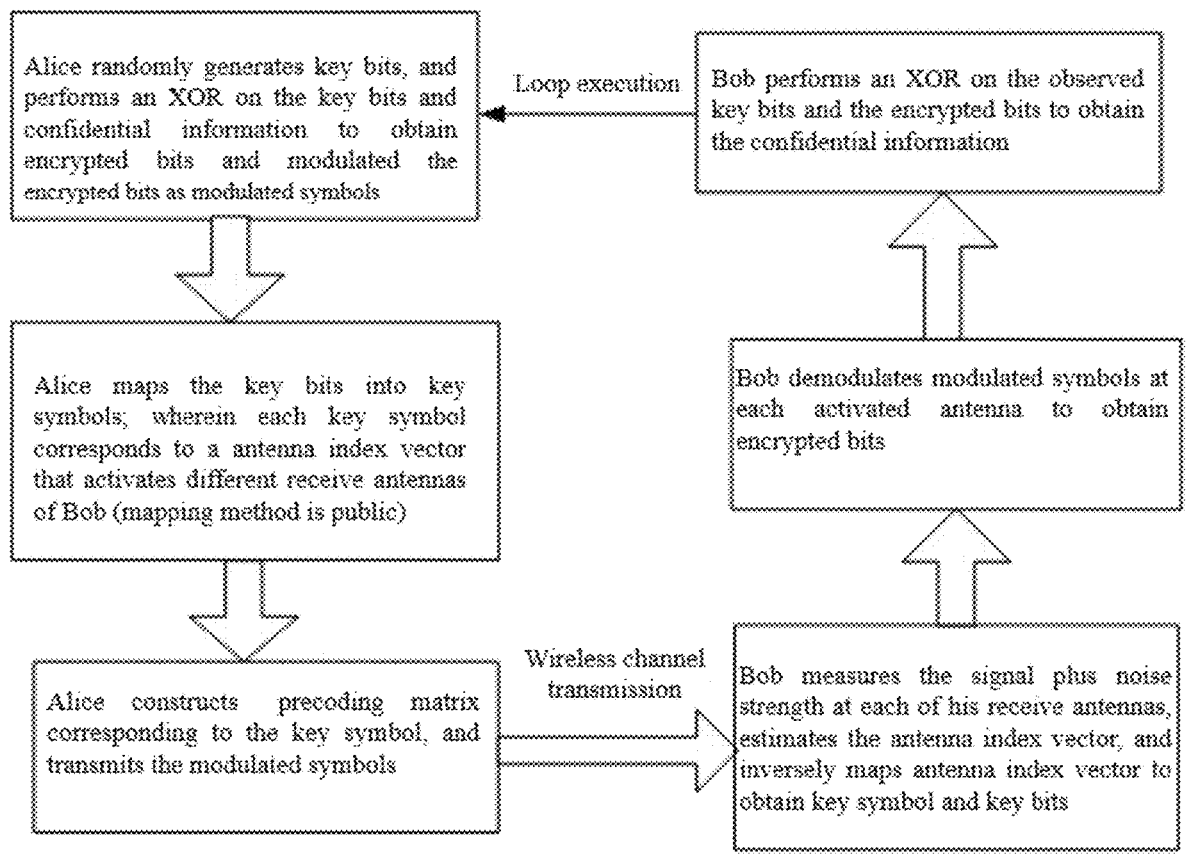
FIG. 2 is a flow chart of the method of the present invention.

As shown in FIG. 2, a method for physical layer secure transmission against an eavesdropper with arbitrary number of eavesdropping antennas includes the following steps:

S1: The legitimate transmitter Alice and the legitimate receiver Bob confirm communication parameters. The parameters include N, which is the stream number of the transmitted symbols where $1 \leq N \leq N_B - 1$. The modulation order $M_S$ and the total number of constellation symbols M.

S2: First, Alice independently generates random bits $b_k$ to encrypt (exclusive-OR: XOR) the binary confidential information b to obtain $b_s$. Alice modulate $b_s = (b_{s,1}, b_{s,2}, \ldots, b_{s,N})$ to modulated symbols $(s_1, s_2, \ldots, s_N)$, $s_i$ denotes the specific constellation symbol. Alice maps the key bits $b_k$ into the key symbol K.

S3: Bob transmits a pilot sequence to Alice, Alice estimates channel $H_{AB}$, and processes it to get a precoding weights space matrix W. According to K, Alice obtains the corresponding antenna index vector e. According to e, Alice chooses different column vectors from W to construct the precoding matrix W(e). Then Alice transmits $s=(s_1, \ldots, s_N)$ by multiplying precoding W(e);

S4: Bob measures the received signal plus noise strength (SPN) of each receive antenna, estimates the antenna index vector, inversely mapping the antenna index vector to obtain key symbols K and key bits $b_k$. Bob demodulates the received modulated symbol $s=(s_1, \ldots, s_N)$ at each activated antenna to obtain $b_s=(b_{s,1}, b_{s,2}, \ldots, b_{s,N})$;

S5: Bob performs XOR on the observed key bits $b_k$ and the demodulated bits $b_s=(b_{s,1}, b_{s,2}, \ldots, b_{s,N})$ to obtain the confidential information bits b; and S6: repeating steps S2-S5.

Further, step S1 includes the following steps:

S11: Alice presents the confidential bits as $b=(b_1, b_2, \ldots, b_N)$, where each $b_i$, $i=1, 2, \ldots, N$, contains $M_S = \log_2 M$ independent bits ($M_S$ and M denote the modulation order and the total number of constellation symbols in the modulation set); and S12: Alice and Bob confirm parameters: the number of symbol streams N and receive antennas $N_B$, such that $$N_K = \binom{N}{N_B}, \quad M_S = \log_2(N_K);$$

Where $M_S$ denotes the order of a constellation signal of the modulation type used by the communication. For example, for binary phase-shift keying (BPSK), $M_S = 1$.

Further, in Step S2, Alice obtains $b_s$ as $$b_s = (b_{s,1}, b_{s,2}, \ldots, b_{s,N}) = (b_1 \oplus b_k, b_2 \oplus b_k, \ldots, b_N \oplus b_k).$$

Further in Step S2, each key symbol K corresponds to different receive antennas $$K = \{0, 1, 2, \ldots, N_k - 1\}.$$

Figure 3:
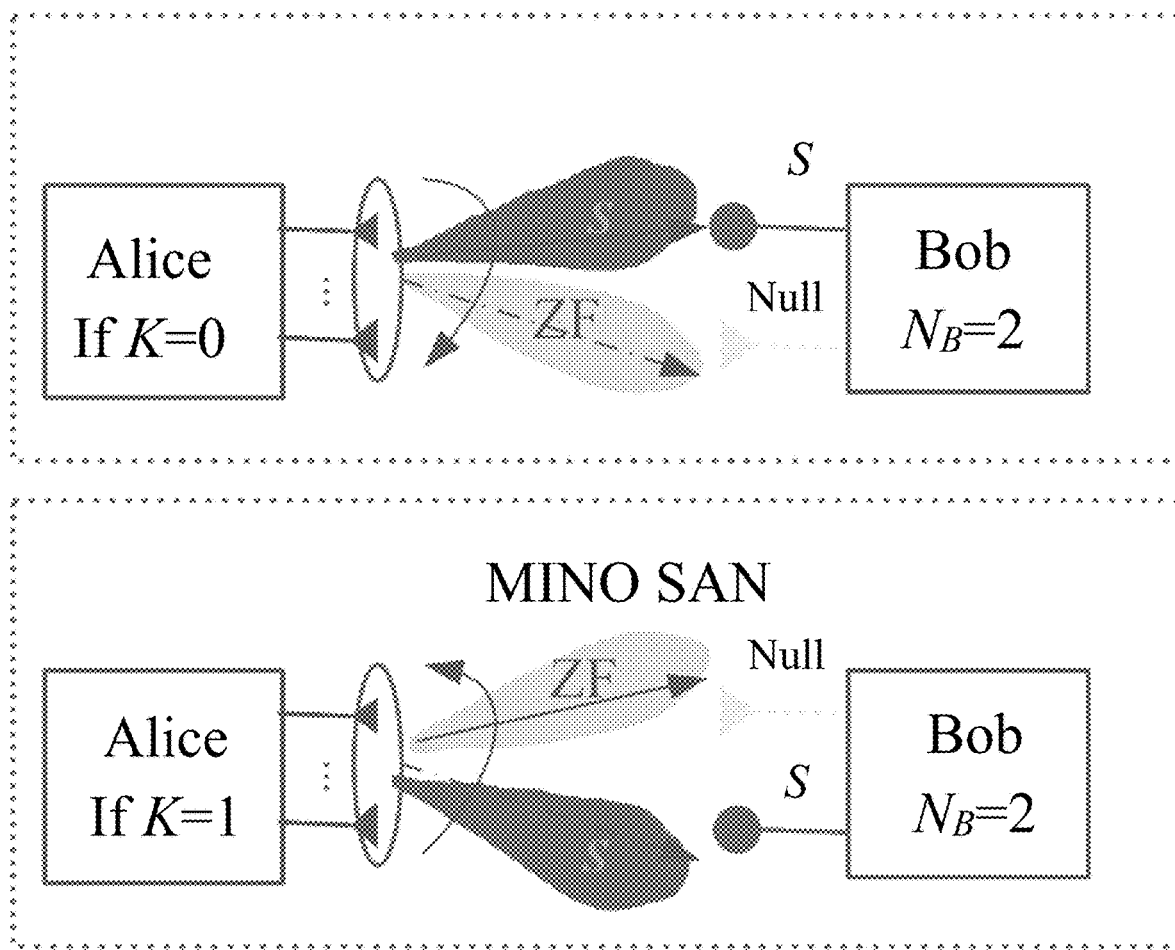
FIG. 3 is a schematic diagram of mapping key symbols to different antenna. vectors of Bob under the condition of N$_B$=2 according to the present invention.

As shown in FIG. 3, the key symbols are mapped to different antenna vectors of Bob. For example, under the condition of $N_B = 2$, if $N_B = 2$, $N = 1$ then $K \in \{0, 1\}$, and all possible antenna combinations E are denoted as:

$$K \in \binom{0}{1} \Leftrightarrow E = \begin{pmatrix} 1 & 0 \\ 0 & 1 \end{pmatrix};$$

wherein, "1" in the first column vector $e_1$ of E denotes Bob's first antenna that is activated, "0" in the first column vector $e_1$ of E denotes Bob's second antenna that is non-activated, and so on.

Further, according to the value of K, Alice selects the (K+1)-th column in E as $e = E(:, K+1)$ and used it as a selection criterion for constructing the precoding. Further, Alice selects N column vectors from W corresponding to the subscript position of N non-zero elements in e to construct precoding W(e) to transmit $s=(s_1, \ldots, s_N)$.

Further, step S3 includes the following steps:

After receiving the pilot sequence, Alice estimates an uplink channel $H_{BA}$ and transposes the uplink channel $H_{BA}$ to obtain a downlink channel $H_{AB} = H_{BA}^T$; and the precoding weights space W is calculated as follows:

$$\tilde{W} = H_{AB}^H (H_{AB} H_{AB}^H)^{-1} = (\tilde{w}_1, \tilde{w}_2, \ldots \tilde{w}_{N_B}); \text{ and}$$

$$W = \left( \frac{\tilde{w}_1}{\|\tilde{w}_1\|}, \frac{\tilde{w}_2}{\|\tilde{w}_2\|}, \ldots \frac{\tilde{w}_{NB}}{\|\tilde{w}_N\|} \right) = (w_1, w_2, \ldots w_{N_B}).$$

Further in Step S3, Alice transmits $s=(_1, \ldots, s_N)$ by multiplying the precoding W(e), and the received signals are expressed as:

$$y = \sqrt{\frac{P_T}{N}} H_{AB} W(e) s + n = \sqrt{\frac{P_T}{N}} \sum_{k=1}^{N} H_{AB} w_i s_k + n, \ i \in \mathcal{I}(e),$$

wherein $\mathcal{I}(e)$ denotes the subscript position of a non-zero element in $e = E(:, K+1)$.

Step S4 includes the following sub steps:

Further, the number of the receive antennas of Bob is $N_B$; after receiving a signal $y \in \mathcal{C}^{N_B \times 1} = [y_1, y_2, \ldots y_{N_B}]^T$, Bob measures the strength of signal-plus-noise (SPN) of each antenna as:

$$\alpha_i = |y_i|^2, \ i = 1, 2, \ldots N_B.$$

S41: Bob selects N maximum values of $\alpha_i$, wherein the subscript of $\alpha_i$ denotes the position corresponding to the non-zero elements in e and then obtaining the observed e according to the subscripts, For example, when N=1, $$\tilde{E}(i, :) = \underbrace{(0, 0, \ldots, 1 \ldots 0)}_{\text{antenna index with the maximum SPN}}$$

$$\text{Max}(\alpha_i) = i \Rightarrow \tilde{E}(i, :) \Rightarrow \tilde{k}_i$$

S42: Bob accordingly obtains his own observed ê, and then obtains the observed key symbols $\hat{K}$ and key bits $\hat{b}_k$ according to the observed ê; and In Step S5 Bob independently demodulates the symbols ŝ at the activated antennas corresponding to N non-zero elements in the observed e to obtain the demodulated bits $\hat{b}_s$; wherein $\hat{s}_i = \arg\min_{s_i \in S} \|y_i - s_1\|^2$, $i = 1, 2, \ldots N$.

Further in Step S5, an XOR is performed by Bob on the observed key bits $\hat{b}_k$ and the decrypted bits $\hat{b}_s$ to obtain the confidential bit information transmitted by Alice:

$$\hat{b}=(\hat{b}_{s,1}\oplus\hat{b}_k, \hat{b}_{s,2}\oplus\hat{b}_k, \ldots \hat{b}_{s,N}\oplus\hat{b}_k).$$

Steps S2 to S5 are repeated to securely transmit confidential information between legitimate transmitter and receiver.

Figure 4:
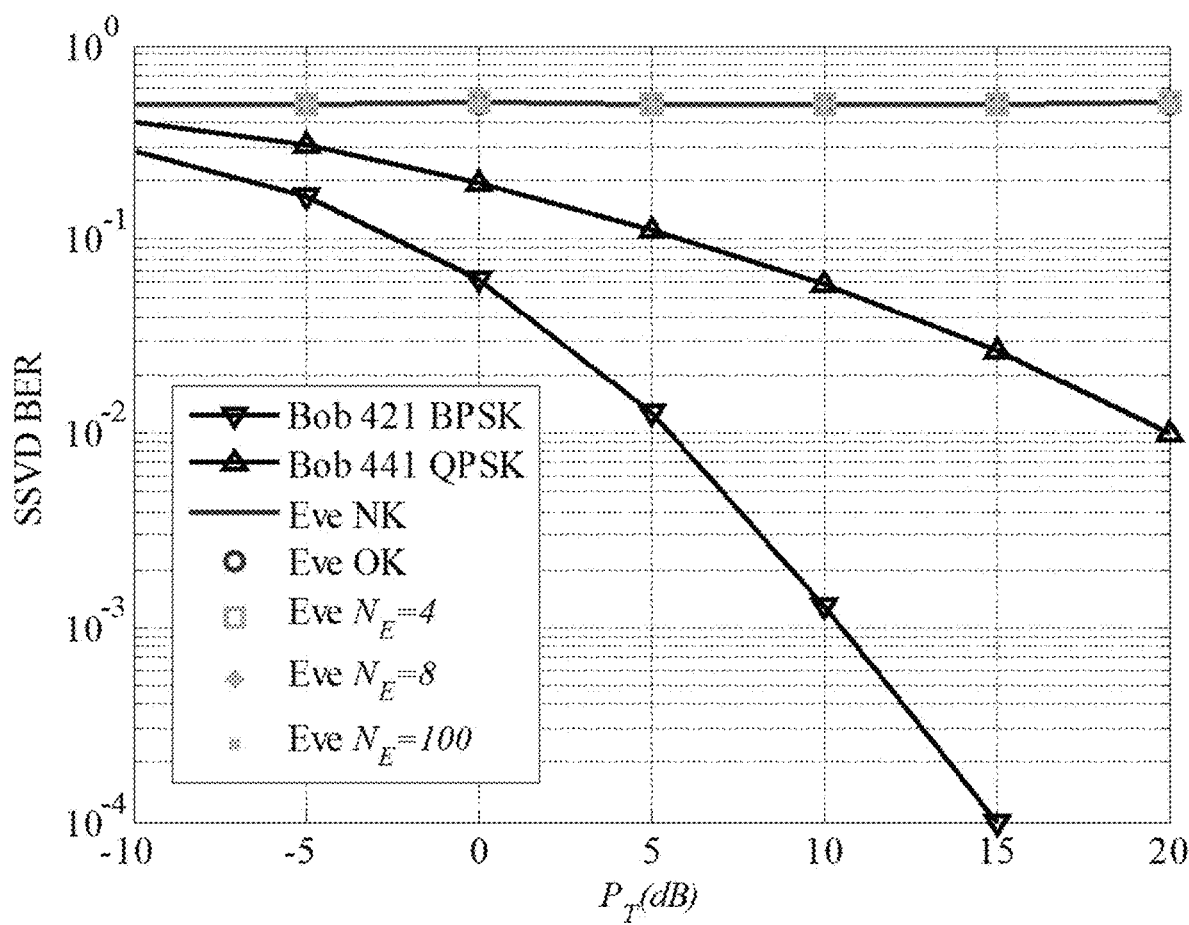
FIG. 4 is a graph showing the bit error rate performance of Bob and the lower bound BER of Eve when Eve sequentially increases the number of eavesdropping antennas according to the present invention.

FIG. 4 shows the final bit error rate performance of Bob and the lower bound of BER of Eve, where Eve uses 1 (labeled as "Eve NK"), 2 (labeled as "Eve OK"), 4, 8, and 100 antennas, respectively, and she processed the signals by using optimal-ratio combining(MRC).

The basic principles and main features and advantages of the present invention have been shown and described above. Those skilled in the art should understand that the present invention is not limited by the foregoing embodiments. The foregoing embodiments and the description in the specification only illustrate the principle of the present invention. The present invention may have various changes and improvements without departing from the spirit and scope of the present invention, and these changes and improvements shall fall within the scope claimed by the present invention. The scope of protection claimed by the present invention is defined by the appended claims.

What is claimed is:

1. A method for physical layer secure transmission against a number of eavesdropping antennas, comprising the following steps:
   S1: confirming a communication between a legitimate transmitter Alice and a legitimate receiver Bob;
   S2: randomly generating, by the legitimate transmitter Alice, a key bit $b_k$ with $M_S$ bits, mapping, by the legitimate transmitter Alice, the key bit $b_k$ into a key symbol K, and performing, by the legitimate transmitter Alice, an XOR on the key bit $b_k$ and to-be-transmitted binary confidential bit information b to obtain an encrypted ciphertext bits $b_s$, and modulating, by the legitimate transmitter Alice, the encrypted ciphertext bits $b_s$ into modulated symbols $s=(s_1, \ldots, s_N)$;
   S3: transmitting a pilot sequence to the legitimate transmitter Alice by the legitimate receiver Bob, calculating a candidate precoding space W by the legitimate transmitter Alice, and transmitting, by the legitimate transmitter Alice, the modulated symbols $s=(s_1, \ldots, s_N)$ by using a precoding W(e);
   S4: independently measuring, by the legitimate receiver Bob, a received signal strength of each receive antenna, estimating, by the legitimate receiver Bob, a vector of the each receive antenna, inversely mapping, by the legitimate receiver Bob, the vector of the each receive antenna to obtain observed key symbols and observed key bits, and demodulating, by the legitimate receiver Bob, the modulated symbols in sequence at each activated antenna to obtain demodulated ciphertext bits;
   S5: performing, by the legitimate receiver Bob, an XOR on the observed key bits and the demodulated ciphertext bits to obtain the to-be-transmitted binary confidential bit information b; and
   S6: repeating steps S2-S5;
   wherein, the legitimate transmitter Alice and the legitimate receiver Bob are each surrounded by a protected zone with a radius R to prevent an eavesdropper Eve from entering the protected zone for eavesdropping, and a channel of the eavesdropper Eve is independent from a channel of the legitimate transmitter Alice and a channel of the legitimate receiver Bob, respectively.

2. The method according to claim 1, wherein,
   step S1 comprises the following steps:
   S11: dividing, by the legitimate transmitter Alice, the to-be-transmitted binary confidential bit information $b=(b_1, b_2, \ldots, b_N)$ into N parts, wherein each part $b_i$, $i=1, 2, \ldots, N$ of the N parts contains bits; and
   S12: determining, by the legitimate receiver Bob, a number $N_B$ of receive antennas and a number N of streams of the modulated symbols, wherein the legitimate transmitter Alice transmits the streams of the modulated symbols simultaneously, wherein $1 \leq N \leq N_B-1$:

$$N_K = \binom{N}{N_B}, \quad M_S = \log_2(N_K);$$

wherein $M_S$ denotes an order of a constellation signal of a modulation type used by the communication.

3. The method according to claim 2, wherein,
the encrypted ciphertext bits $b_s$ is calculated as follows:

$$b_s=(b_{s,1}, b_{s,2}, \ldots, b_{s,N})=(b_1\oplus b_k, b_2\oplus b_k, \ldots, b_N\oplus b_k).$$

4. The method according to claim 2, wherein,
after receiving the pilot sequence, the legitimate transmitter Alice estimates an uplink channel $H_{BA}$ and transposes the uplink channel $H_{BA}$ to obtain a downlink channel $H_{AB}=H_{BA}^T$; and the candidate preceding space W is calculated as follows:

$$\tilde{W} = H_{AB}^H(H_{AB}H_{AB}^H)^{-1} = (\tilde{w}_1, \tilde{w}_2, \ldots \tilde{w}_{N_B}); \text{ and}$$

$$W = \left(\frac{\tilde{w}_1}{\|\tilde{w}_1\|}, \frac{\tilde{w}_2}{\|\tilde{w}_2\|}, \ldots \frac{\tilde{w}_{NB}}{\|\tilde{w}_N\|}\right) = (w_1, w_2, \ldots w_{N_B}).$$

5. The method according to claim 2, wherein,
the key symbol corresponds to different receive antennas $K=\{0, 1, 2, \ldots, N_k-1\}$ activated at the legitimate receiver Bob, and antenna combinations are denoted by a vector E.

6. The method according to claim 5, wherein,
the key symbols $K \in \kappa$, according to a value of the key symbol K, a (K+1)-th column in the vector E is selected as E(:, K+1) and used as a selection criterion for transmitting the precoding W(e).

7. The method according to claim 6, wherein,
N non-zero column vectors corresponding to the E(:, K+1) are selected, from the candidate precoding space W, as the precoding W(e).

8. The method according to claim 4, wherein,
the legitimate transmitter Alice transmits the modulated symbols $s=(s_1, \ldots, s_N)$ by using the precoding W(e), and received signals are expressed as:

$$y = \sqrt{\frac{P_T}{N}} H_{AB}W(e)s + n = \sqrt{\frac{P_T}{N}} \sum_{k=1}^{N} H_{AB}w_i s_k + n, \quad i \in I(e),$$

wherein I (e) denotes a subscript position of a non-zero element in E(:, K+1).

9. The method according to claim 1, wherein,
step S2 further comprises:
S21: modulating the encrypted ciphertext bits $b_s$ into the modulated symbols $s=(s_1, \ldots, s_N)$ to be transmitted.

10. The method according to claim 1, wherein, a number of receive antennas of the legitimate receiver Bob is $N_B$; after receiving a signal $y \in \mathcal{C}^{N_B \times 1}[y_1, y_2, \ldots, y_{N_B}]^T$, the legitimate receiver Bob measures an intensity of signal-plus-noise (SPN) of the each antenna as: $\alpha_i = |y_i|^2$, $i=1, 2, \ldots N_B$.

11. The method according to claim 10, wherein, step S4 comprises the following steps:

S41: selecting, by the legitimate receiver Bob, N maximum values of $\alpha_i$, and obtaining observed e according to a subscript of the $\alpha_i$;

S42: obtaining the observed key symbols K and the observed key bits $\hat{b}_k$ according to the observed e; and S43: independently demodulating, by the legitimate receiver Bob, symbols ŝ at antennas corresponding to N non-zero elements in the observed e to obtain the demodulated ciphertext bits $\hat{b}_s$; wherein $\hat{s}_l = \arg\min_{s_l \in s} \|y_i - s_l\|^2$, $i=1, 2, \ldots N$.

12. The method according to claim 11, wherein, an XOR is performed on the observed key bits $\hat{b}_k$ and the demodulated ciphertext bits $\hat{b}_s$ to obtain the to-be-transmitted binary confidential bit information to be transmitted by the legitimate transmitter Alice as follows:

$\hat{b} = (\hat{b}_{s,1} \oplus \hat{b}_k, \hat{b}_{s,2} \oplus \hat{b}_k, \ldots, \hat{b}_{s,N} \oplus \hat{b}_k)$.

13. The method according to claim 1, wherein, the radius R of the protected zone is larger than a channel uncorrelated distance, and the radius R is determined by a channel propagation environment and a carrier frequency.

14. The method according to claim 6, wherein, the legitimate transmitter Alice transmits the modulated symbols $s = (s_1, \ldots, s_N)$ by using the precoding $W(e)$, and received signals are expressed as:

$$y = \sqrt{\frac{P_T}{N}} H_{AB} W(e) s + n = \sqrt{\frac{P_T}{N}} \sum_{k=1}^{N} H_{AB} w_i s_k + n, \ i \in \mathcal{I}(e),$$

wherein $\mathcal{I}(e)$ denotes a subscript position of a non-zero element in the $E(:, K\ 1)$.

* * * * *